United States Patent
Kim et al.

(10) Patent No.: US 10,006,522 B2
(45) Date of Patent: Jun. 26, 2018

(54) CONTROL DEVICE FOR AUTOMATIC TRANSMISSION

(71) Applicant: TOYOTA JIDOSHA KABUSHIKI KAISHA, Toyota-shi (JP)

(72) Inventors: Jonggap Kim, Hadano (JP); Masami Kondo, Niwa-gun (JP); Hideo Watanabe, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 232 days.

(21) Appl. No.: 15/193,847

(22) Filed: Jun. 27, 2016

(65) Prior Publication Data

US 2017/0002923 A1    Jan. 5, 2017

(30) Foreign Application Priority Data

Jun. 30, 2015    (JP) .................................. 2015-131475

(51) Int. Cl.
| | |
|---|---|
| *F16H 59/00* | (2006.01) |
| *F16H 61/00* | (2006.01) |
| *F16H 3/66* | (2006.01) |
| *F16H 61/04* | (2006.01) |
| *F16H 61/686* | (2006.01) |

(52) U.S. Cl.
CPC ............ *F16H 3/663* (2013.01); *F16H 61/04* (2013.01); *F16H 61/686* (2013.01); *F16H 2061/0444* (2013.01); *F16H 2061/0455* (2013.01); *F16H 2200/0069* (2013.01); *F16H 2200/201* (2013.01); *F16H 2200/2046* (2013.01)

(58) Field of Classification Search
CPC .............................. B60W 10/02; B60W 10/04
USPC ............... 74/335; 477/70, 73, 79, 76, 90, 91
See application file for complete search history.

(56) References Cited

U.S. PATENT DOCUMENTS

| | | | | |
|---|---|---|---|---|
| 7,470,212 | B2 * | 12/2008 | Inagaki | F16H 61/061 477/107 |
| 7,678,014 | B2 * | 3/2010 | Nohara | B60K 6/365 475/5 |

(Continued)

FOREIGN PATENT DOCUMENTS

| | | |
|---|---|---|
| CN | 101410657 A | 4/2009 |
| JP | 10-103497 | 4/1998 |

(Continued)

*Primary Examiner* — Ha Dinh Ho
(74) *Attorney, Agent, or Firm* — Oblon, McClelland, Maier & Neustadt, L.L.P.

(57) ABSTRACT

A control device for an automatic transmission is provided. The automatic transmission is configured to realize a plurality of gear shift stages by combination of a plurality of engaging devices engaged or released among the plurality of engaging devices. The control device includes an electronic control unit. The electronic control unit is configured to select, as the setting pattern realizing an intermediate gear shift stage, the setting pattern with a smaller number of switching of the engagement or release of the engaging device than the number of switching of the setting pattern with the largest number of switching among the plurality of setting patterns when a shift is performed from a first gear shift stage to a second gear shift stage through the intermediate gear shift stage in a case where the electronic control unit determines that the shift is to be performed through the intermediate gear shift stage.

4 Claims, 10 Drawing Sheets

(56) References Cited

U.S. PATENT DOCUMENTS

| | | | | |
|---|---|---|---|---|
| 9,815,455 | B2* | 11/2017 | Tsuda | B60W 20/30 |
| 2008/0064563 | A1* | 3/2008 | Kobayashi | F16H 61/08 477/34 |
| 2008/0064565 | A1* | 3/2008 | Doi | F16H 61/16 477/75 |
| 2009/0187317 | A1 | 7/2009 | Sugano et al. | |
| 2009/0210121 | A1* | 8/2009 | Tokura | F16H 61/0437 701/55 |
| 2014/0303858 | A1 | 10/2014 | Kameda et al. | |

FOREIGN PATENT DOCUMENTS

| | | |
|---|---|---|
| JP | 2004-293709 A | 10/2004 |
| JP | 2008-32156 | 2/2008 |
| JP | 2014-202249 A | 10/2014 |

* cited by examiner

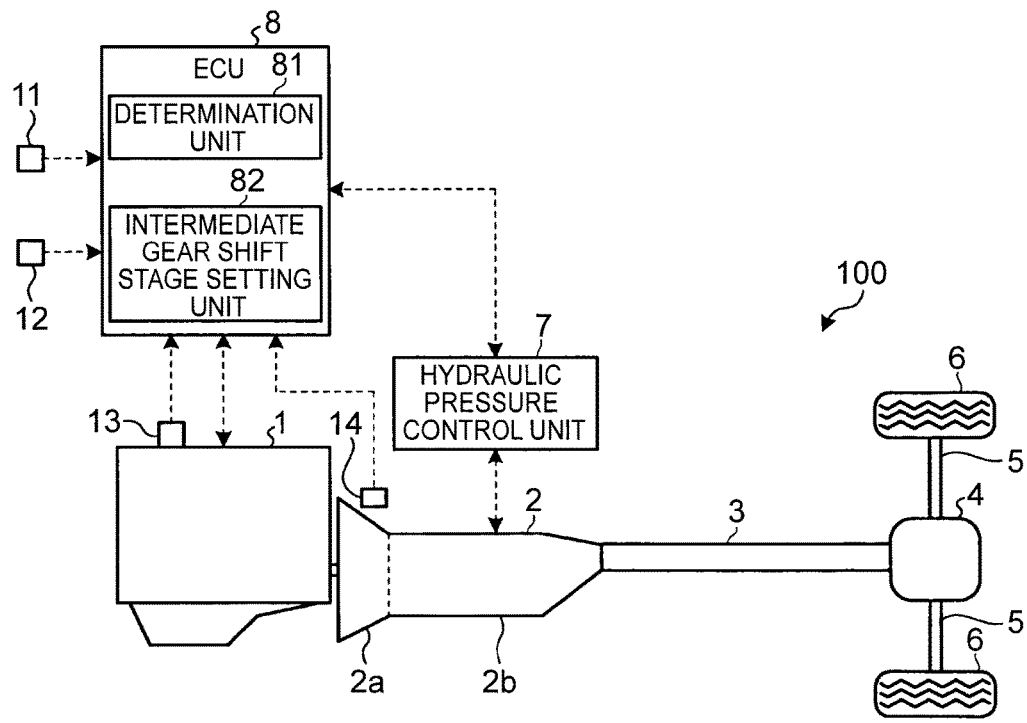
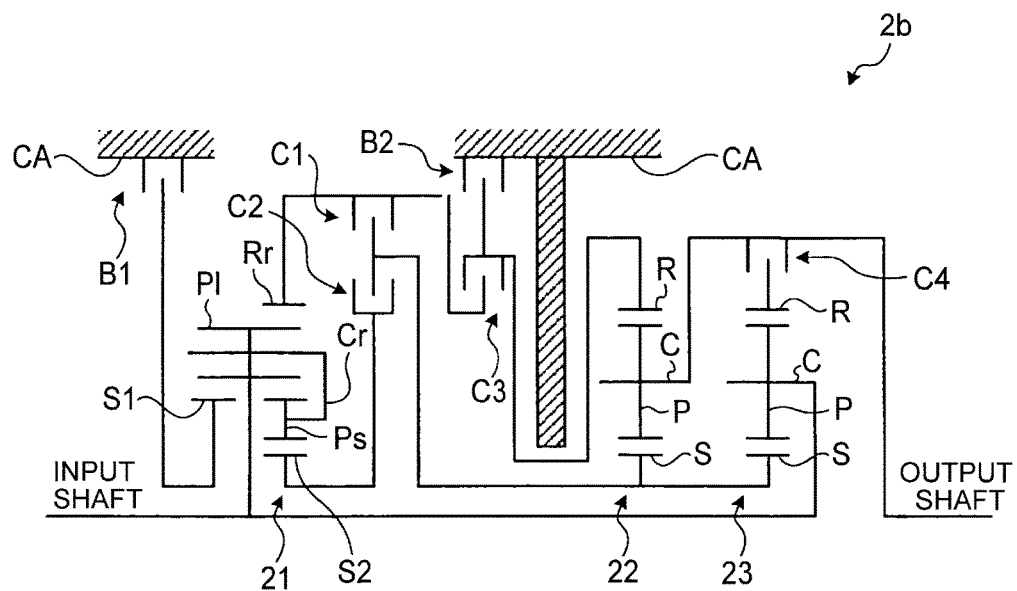

FIG. 3

| OPERATION TABLE | C1 | C2 | C3 | C4 | B1 | B2 |
|---|---|---|---|---|---|---|
| 1st | O | O | | | | O |
| 2nd | O | | | | O | O |
| 3rd | | O | | | O | O |
| 4th | | | | O | O | O |
| 5th | | O | | O | O | |
| 6th | O | | | O | O | |
| 7th | O | | O | O | | |
| 8th | | | O | O | O | |
| 9th | O | | O | | O | |
| 10th | | O | O | | O | |
| Rev | | O | O | | | O |

FIG. 4

| 7th | C1 | C2 | C3 | C4 |
|---|---|---|---|---|
| PATTERN 1 | O | O | O | O |
| PATTERN 2 | O | O | O | |
| PATTERN 3 | O | O | | O |
| PATTERN 4 | O | | O | O |
| PATTERN 5 | | O | O | O |

FIG. 6A

|      | C1 | C2 | C3 | C4 |
|------|----|----|----|----|
| 10th |    | O  | O  |    |
| 7th  |    | O  | O  | O  |
| 6th  | O  |    |    | O  |

|      | C1 | C2 | C3 | C4 |
|------|----|----|----|----|
| 10th |    | O  | O  |    |
| 7th  |    | O  | O  | O  |
| 5th  |    | O  |    | O  |

|      | C1 | C2 | C3 | C4 |
|------|----|----|----|----|
| 10th |    | O  | O  |    |
| 7th  |    | O  | O  | O  |
| 4th  |    |    |    | O  |

|      | C1 | C2 | C3 | C4 |
|------|----|----|----|----|
| 10th |    | O  | O  |    |
| 7th  | O  | O  | O  |    |
| 3rd  |    | O  |    |    |

DW ↓  UP ↑

CONTROL DEVICE FOR AUTOMATIC TRANSMISSION

INCORPORATION BY REFERENCE

The disclosure of Japanese Patent Application No. 2015-131475 filed on Jun. 30, 2015 including the specification, drawings and abstract is incorporated herein by reference in its entirety.

BACKGROUND OF THE INVENTION

1. Field of the Invention

The invention relates to a control device for an automatic transmission.

2. Description of Related Art

In a vehicle according to the related art in which a stepped automatic transmission is mounted, a gear shift stage is set in accordance with a shift map set in advance and in accordance with a current accelerator opening degree, a current vehicle speed, and the like. For example, the gear shift stage of the automatic transmission is set to a 1st speed when the vehicle is started, and the gear shift stage is subjected to a sequential upshift to an adjacent higher gear stage as the vehicle speed increases after the start. In some cases, a so-called jump-over gear shift is performed in a case where, for example, a driver performs a kick-down by significantly depressing an accelerator pedal. The jump-over gear shift refers to a shift of the gear shift stage of the automatic transmission to a gear shift stage separated by at least two stages from the current gear shift stage. When an intermediate gear shift stage is passed through in the case of the jump-over gear shift according to a technique disclosed in Japanese Patent Application Publication No. 10-103497 (JP 10-103497 A), the length of time during which the intermediate gear shift stage is passed through is set in accordance with the type of the shift such that shift control accuracy is improved.

SUMMARY OF THE INVENTION

A sense of sluggish acceleration that the driver feels during the shift is suppressed when the intermediate gear shift stage is passed through in a case where the jump-over gear shift is performed. In a case where the automatic transmission is a type of automatic transmission that has a plurality of engaging means which have engaging elements engaged with each other and a plurality of the gear shift stages can be set by the engaging means engaged or released among these plurality of engaging means, however, the execution of the jump-over gear shift through the intermediate gear shift stage might result in an increase in the number of times of the execution of the engagement or release of the engaging means. This, in turn, leads to the generation of an excessive shift shock in some cases.

The invention provides a control device for an automatic transmission that is capable of suppressing an excessive shift shock which is generated when an intermediate gear shift stage is passed through during a jump-over gear shift.

According to an aspect of the invention, a control device for an automatic transmission is provided. The automatic transmission is mounted in a vehicle. The automatic transmission includes a plurality of engaging devices having engaging elements engaged with each other. The automatic transmission is configured to realize a plurality of gear shift stages by combination of the plurality of engaging devices engaged or released among the plurality of engaging devices. The control device includes an electronic control unit. The electronic control unit is configured to determine whether or not to perform a shift through an intermediate gear shift stage present between a first gear shift stage and a second gear shift stage when the shift is performed to the second gear shift stage separated by at least two stages from the first gear shift stage. The combination of the engaging devices realizing the intermediate gear shift stage has a plurality of setting patterns. The electronic control unit is configured to select, as the setting pattern realizing the intermediate gear shift stage, the setting pattern with a smaller number of switching of the engagement or release of the engaging device than the number of switching of the setting pattern with the largest number of switching among the plurality of setting patterns when the shift is performed from the first gear shift stage to the second gear shift stage through the intermediate gear shift stage in a case where the electronic control unit determines that the shift is to be performed through the intermediate gear shift stage.

According to the control device of the aspect described above, the setting pattern with the smaller number of switching of the engagement or release of the engaging device than the number of switching of the setting pattern with the largest number of switching is selected as the setting pattern realizing the intermediate gear shift stage as the intermediate gear shift stage to be passed through when the shift is performed from the first gear shift stage to the second gear shift stage through the intermediate gear shift stage. Accordingly, the number of occurrences of a shock that is associated with the engagement and release of the engaging device is reduced or does not increase, and thus an excessive shift shock can be suppressed.

In the control device according to the aspect described above, the electronic control unit may be configured to select, as the setting pattern realizing the intermediate gear shift stage, the setting pattern including the engaging device realizing a down side gear shift stage the most adjacent to the second gear shift stage in a case where it is determined that the intermediate gear shift stage cannot be realized with the engaging device realizing the first gear shift stage and the engaging device realizing the second gear shift stage alone with the second gear shift stage being a gear shift stage on a downshift side of the first gear shift stage. According to this aspect, the number of switching of the engagement and release of the engaging device is reduced even in a case where the shift is additionally performed from the second gear shift stage to the most adjacent down side gear shift stage, and thus the excessive shift shock can be suppressed and a rapid acceleration response can be obtained.

In the control device according to the aspect described above, the electronic control unit may be configured to select, as the setting pattern realizing the intermediate gear shift stage, the setting pattern including the engaging device realizing a down side gear shift stage the most adjacent to the second gear shift stage in a case where the setting pattern with the smaller number of switching is not present with the second gear shift stage being a gear shift stage on a downshift side of the first gear shift stage. According to this aspect, the number of switching of the engagement and release of the engaging device does not increase even in a case where the shift is additionally performed from the second gear shift stage to the most adjacent down side gear shift stage, and thus the excessive shift shock can be suppressed and the rapid acceleration response can be obtained.

In the control device according to the aspect described above, the electronic control unit may be configured to select, as the setting pattern realizing the intermediate gear shift stage, the setting pattern in which the number of the engaging devices engaged or released when the shift is performed between a downshift side gear shift stage the most adjacent to the second gear shift stage and the intermediate gear shift stage becomes two or less when the number of the engaging devices engaged or released is four or more in a case where the shift is performed from the first gear shift stage to the second gear shift stage with the second gear shift stage being a gear shift stage on a downshift side of the first gear shift stage. According to this aspect, the number of switching of the engagement and release of the engaging device is reduced even in a case where the shift is additionally performed from the second gear shift stage to the most adjacent down side gear shift stage, and thus the excessive shift shock can be suppressed and the rapid acceleration response can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic configuration diagram of a vehicle in which a control device for an automatic transmission according to an embodiment is mounted;

FIG. 2 is a skeleton diagram of the automatic transmission that is illustrated in FIG. 1;

FIG. 3 is a diagram illustrating an operation engagement table for each gear shift stage of the automatic transmission that is illustrated in FIG. 1;

FIG. 4 is a diagram illustrating a plurality of clutch combination setting patterns forming a 7th speed of the automatic transmission that is illustrated in FIG. 1;

FIG. 6A is a diagram illustrating an example of a pattern selected in a case where an intermediate gear stage that is passed through when a jump-over gear shift is performed is the 7th speed;

FIG. 6B is a diagram illustrating an example of the pattern selected in a case where the intermediate gear stage that is passed through when the jump-over gear shift is performed is the 7th speed;

FIG. 6C is a diagram illustrating an example of the pattern selected in a case where the intermediate gear stage that is passed through when the jump-over gear shift is performed is the 7th speed;

FIG. 6D is a diagram illustrating an example of the pattern selected in a case where the intermediate gear stage that is passed through when the jump-over gear shift is performed is the 7th speed;

DETAILED DESCRIPTION OF EMBODIMENTS

Figure 5:
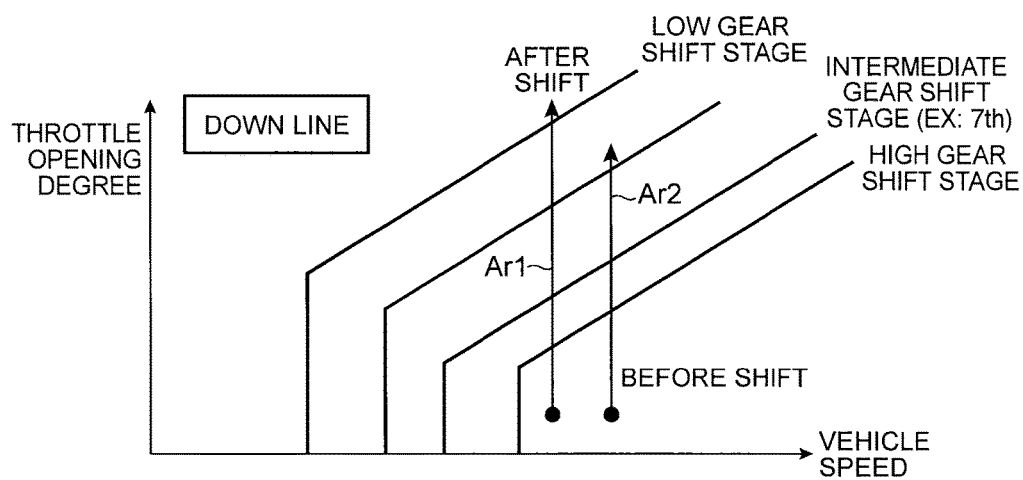
FIG. 5 is a shift diagram of the control device for an automatic transmission according to the embodiment.

Hereinafter, an embodiment of a control device for an automatic transmission according to the invention will be described in detail with reference to accompanying drawings. The invention is not limited to the embodiment. In the drawings, the same reference numerals will be appropriately used to refer to the same or corresponding elements, and duplicate description thereof will be omitted.

FIG. 1 is a schematic configuration diagram of a vehicle in which the control device for an automatic transmission according to the embodiment is mounted. As illustrated in FIG. 1, a vehicle 100 is provided with a power source 1, an automatic transmission 2, a propeller shaft 3, a differential gear 4, right and left driving shafts 5, right and left driving wheels 6, a hydraulic pressure control unit 7, an electronic control unit (ECU) 8, a vehicle speed sensor 11, an accelerator opening degree sensor 12, a crank angle sensor 13, and a turbine rotation speed sensor 14.

In this embodiment, the power source 1, which is a power source of the vehicle 100, is a turbocharger-attached engine. The power source 1 converts the combustion energy of a fuel into a rotary motion of an output shaft and outputs the rotary motion. The power source 1 may be an engine to which no turbocharger is attached. In addition, the power source 1 is not limited to the engine. For example, the power source 1 may be a motor.

The automatic transmission 2 is provided with a torque converter unit 2a to which a lock-up clutch is attached and an automatic gear shift unit 2b. The torque converter unit 2a is provided with a pump impeller, a turbine runner, and the lock-up clutch. The pump impeller is connected to the power source 1 and rotates integrally with the output shaft of the power source 1. The turbine runner is connected to an input shaft of the automatic gear shift unit 2b and rotates integrally with the input shaft of the automatic gear shift unit 2b. The lock-up clutch is a frictional engagement-type clutch device that is disposed between the output shaft of the power source 1 and the input shaft of the automatic gear shift unit 2b. In a state of engagement, the lock-up clutch mechanically connects the power source 1 and the automatic gear shift unit 2b to each other, which allows the pump impeller and the turbine runner to rotate integrally with each other. In a case where the lock-up clutch is in a state of release, the pump impeller and the turbine runner transmit torque via a fluid.

As illustrated in FIG. 2, a first planetary device 21, a second planetary device 22, a third planetary device 23, and a plurality of engaging devices that are disposed in a housing CA constitute the automatic gear shift unit 2b. The engaging devices, which have engaging elements that are in frictional engagement with each other, include a first clutch C1, a second clutch C2, a third clutch C3, a fourth clutch C4, a first brake B1, and a second brake B2. The automatic gear shift unit 2b realizes a shift to a required gear shift stage by causing these engaging devices to be engaged or released in accordance with the required gear shift stage between an input and an output.

The first planetary device 21 is a Ravigneaux-type planetary gear mechanism. The first planetary device 21 has a first sun gear S1, a second sun gear S2, a ring gear Rr, a plurality of long pinion gears P1, a plurality of short pinion gears Ps, and a carrier Cr as a plurality of rotating elements that are capable of differential rotation. Each of the second planetary device 22 and the third planetary device 23 is a single pinion-type planetary gear mechanism and has a sun gear S, a ring gear R, a plurality of pinion gears P, and a carrier C as a plurality of rotating elements that are capable of differential rotation. The torque that is input to the input shaft of the automatic gear shift unit 2b is output from an output shaft via the ring gear R of the third planetary device 23 and is transmitted to the driving wheels 6 via the propeller shaft 3, the differential gear 4, and the driving shafts 5.

The first clutch C1 is provided with a first engaging portion and a second engaging portion. The first engaging portion is capable of rotating integrally with the ring gear Rr of the first planetary device 21, and the second engaging portion is capable of rotating integrally with the respective sun gears S of the second planetary device 22 and the third planetary device 23. An engaging operation and a releasing operation between the first engaging portion and the second engaging portion are hydraulically controlled. The second clutch C2, the third clutch C3, and the fourth clutch C4 are hydraulically-driven frictional engagement devices as is the case with the first clutch C1. The second clutch C2 is provided with a first engaging portion and a second engaging portion. The first engaging portion is capable of rotating integrally with the second sun gear S2 of the first planetary device 21, and the second engaging portion is capable of rotating integrally with the respective sun gears S of the second planetary device 22 and the third planetary device 23. The third clutch C3 is provided with a first engaging portion and a second engaging portion. The first engaging portion is capable of rotating integrally with a second engaging portion of the second brake B2 (described later), and the second engaging portion is capable of rotating integrally with the ring gear R of the second planetary device 22. The fourth clutch C4 is provided with a first engaging portion and a second engaging portion. The first engaging portion is capable of rotating integrally with the carrier C of the second planetary device 22, and the second engaging portion is capable of rotating integrally with the ring gear R of the third planetary device 23.

The first brake B1 and the second brake B2 are hydraulically-driven frictional engagement devices as is the case with the first clutch C1. The first brake B1 is provided with a first engaging portion and a second engaging portion. The first engaging portion is fixed to the housing CA, and the second engaging portion is capable of rotating integrally with the first sun gear S1 of the first planetary device 21. The second brake B2 is provided with a first engaging portion and the second engaging portion. The first engaging portion is fixed to the housing CA, and the second engaging portion is capable of rotating integrally with the first engaging portion of the third clutch C3 described above.

FIG. 3 is a drawing illustrating an operation engagement table for each gear shift stage of the automatic gear shift unit 2b. In the operation engagement table, circles represent the state of engagement and blanks represent the state of release. In addition, "1st", "2nd" "3rd", "4th", "5th", "6th", "7th", "8th", "9th", and "10th" represent respective gear shift stages from a 1st speed to a 10th speed in a forward D range. Furthermore, "Rev" represents a gear shift stage in a reverse R range. At the 1st speed, for example, each of the first clutch C1, the second clutch C2, and the second brake B2 is engaged.

In the automatic gear shift unit 2b, a transmission gear ratio that corresponds to the 7th speed is realized by not only the engagement combination that is illustrated in the operation engagement table in FIG. 3 but also another combination. FIG. 4 is a drawing illustrating a plurality of setting patterns (hereinafter, simply referred to as patterns if appropriate) of the combination of the states of engagement or the open states of the clutches realizing the transmission gear ratio that corresponds to the 7th speed. In other words, the 7th speed can be realized by the combination of the states of engagement or the open states of the clutches according to the five patterns illustrated in FIG. 4 at the least. In the operation engagement table that is illustrated in FIG. 3, only the combination according to Pattern 4 is shown representatively.

Referring back to FIG. 1, the hydraulic pressure control unit 7 controls the engaging operations and the releasing operations of the first clutch C1, the second clutch C2, the third clutch C3, the fourth clutch C4, the first brake B 1, and the second brake B2 by controlling the hydraulic pressure of a hydraulic oil. The hydraulic pressure that is controlled by the hydraulic pressure control unit 7 is given by an oil pump (not illustrated).

The vehicle speed sensor 11 detects a vehicle speed of the vehicle 100. The accelerator opening degree sensor 12 detects an accelerator opening degree corresponding to the amount by which an accelerator pedal is depressed by a driver. The crank angle sensor 13 is disposed in a crankshaft of the power source 1 that is the engine. The crank angle sensor 13 detects a crank angle that is used for the calculation of a power source rotation speed (engine rotation speed). The turbine rotation speed sensor 14 detects a rotation speed of the turbine runner of the torque converter unit 2a. Each of the vehicle speed sensor 11, the accelerator opening degree sensor 12, the crank angle sensor 13, and the turbine rotation speed sensor 14 is electrically connected to the ECU 8 so that results of the detection are output to the ECU 8.

Physically, the ECU 8 that is the control device for the automatic transmission 2 is an electronic circuit which has, as a main component, a known microcomputer including a central processing unit (CPU), a random access memory (RAM), a read-only memory (ROM), and an interface such as an input and output interface. The function of each section of the ECU 8 is realized by an object to be controlled being operated based on a CPU control by an application program stored in the ROM being loaded onto the RAM and being executed by the CPU and reading and writing of data being performed in the RAM and the ROM. The ECU 8 may be configured to include a plurality of ECUs that individually control the power source 1, the automatic transmission 2, and the like. In this case, the ECUs can be configured to be capable of intercommunication and can perform transmission and reception of various commands, results of the detection by the various sensors, and the like.

The results of the detection by the various sensors described above are input to the ECU 8. The ECU 8 detects engine operation states based on the input and controls the quantity and a timing of fuel injection by an injector, a timing of ignition by a spark plug, and the like.

In addition, the ECU 8 outputs a control signal to the hydraulic pressure control unit 7, with reference to a pre-stored shift map, shift diagram, or the like and the operation engagement table, based on the vehicle speed detection result, the accelerator opening degree detection result, and the like. The hydraulic pressure control unit 7 controls the first clutch C1, the second clutch C2, the third clutch C3, the fourth clutch C4, the first brake B1, and the second brake B2 of the automatic gear shift unit 2b based on the control signal. This allows the shift to be performed in the automatic gear shift unit 2b.

For example, FIG. 5 is the shift diagram of the ECU 8. Only a down line is illustrated in FIG. 5. The horizontal axis represents the vehicle speed, and the vertical axis represents a throttle opening degree that corresponds to the accelerator opening degree. As illustrated in FIG. 5, once the accelerator pedal is depressed by the driver and the throttle opening degree increases at a certain vehicle speed, the gear shift stage that used to be a high gear (for example, the 8th speed or higher) before the accelerator pedal depression (before the shift) is shifted to a low gear by jumping over an intermediate gear stage (for example, the 7th speed) as illustrated by arrows Ar1 and Ar2.

The ECU 8 is also provided with a determination unit 81 as determination means and an intermediate gear shift stage setting unit 82 as intermediate gear shift stage setting means. In a case where a jump-over gear shift, which is a shift to a second gear shift stage (gear stage) that is a gear shift stage separated by at least two stages from a first gear shift stage (gear stage) that is the current gear shift stage, is performed, the determination unit 81 determines whether or not to perform the shift through the intermediate gear shift stage (intermediate gear stage) between the first gear stage and the second gear stage. In a case where the determination unit 81 determines that the shift is to be performed through the intermediate gear stage, the intermediate gear shift stage setting unit 82 selects, as the setting pattern realizing the intermediate gear shift stage, the setting pattern with the number of switching of the engagement or release of the engaging device smaller than that of the setting pattern with the largest number of switching among the plurality of setting patterns in the intermediate gear stage during the shift from the first gear stage to the second gear stage through the intermediate gear stage. Then, the number of occurrences of a shock that is associated with the engagement and release of the engaging device is reduced, and thus an excessive shift shock that is generated when the intermediate gear shift stage is passed through can be suppressed.

In a case where it is determined that the intermediate gear shift stage cannot be realized by the engaging device realizing the first gear shift stage and the engaging device realizing the second gear shift stage alone with the second gear shift stage being a gear shift stage on the downshift side of the first gear shift stage, the intermediate gear shift stage setting unit 82 selects, as the setting pattern realizing the intermediate gear shift stage, the setting pattern including the engaging device that realizes the down side gear shift stage which is the most adjacent to the second gear shift stage. Then, the engaging device that realizes the down side gear shift stage which is the most adjacent to the second gear shift stage (the most adjacent down side gear shift stage) can remain temporarily engaged when the intermediate gear shift stage is formed in a case where a further downshift is executed, examples of which include the driver's additional accelerator depression for achieving a larger driving force and rapid acceleration, and thus the number of switching of the engagement and release of the engaging device is reduced even in the case of a subsequent shift to the most adjacent down side gear stage. As a result, the excessive shift shock can be suppressed and a rapid acceleration response can be obtained.

In a case where no setting pattern with the smaller number of switching is present with the second gear shift stage being the gear shift stage on the downshift side of the first gear shift stage, the intermediate gear shift stage setting unit 82 selects, as the setting pattern realizing the intermediate gear shift stage, the setting pattern including the engaging device that realizes the down side gear shift stage which is the most adjacent to the second gear shift stage. Then, in the same manner as described above, the number of switching of the engagement and release of the engaging means does not increase even in the case of a further shift from the second gear shift stage to the most adjacent down side gear shift stage. As a result, the excessive shift shock can be suppressed and the rapid acceleration response can be obtained.

In the case of a shift from the first gear shift stage to the second gear shift stage with the second gear shift stage being the gear shift stage on the downshift side of the first gear shift stage, the intermediate gear shift stage setting unit 82 can select, as the setting pattern realizing the intermediate gear shift stage, the setting pattern such that the number of the engaging devices engaged or released when the shift is performed between the downshift side gear shift stage which is the most adjacent to the second gear shift stage and the intermediate gear shift stage is two or less when at least four of the engaging devices are engaged or released. Then, in the same manner as described above, the number of switching of the engagement and release of the engaging means decreases even in the case of a further shift from the second gear shift stage to the most adjacent down side gear shift stage. As a result, the excessive shift shock can be suppressed and the rapid acceleration response can be obtained.

Hereinafter, this embodiment will be described in more detail. Firstly, the setting pattern will be described that is selected in a case where the jump-over gear shift is performed from the 10th speed that is the first gear shift stage to the 6th speed or less that is the second gear shift stage through the 7th speed that is the intermediate gear shift stage.

Figure 7A:
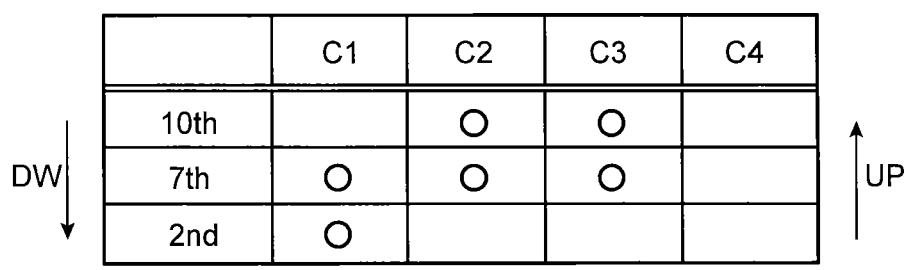
FIG. 7A is a diagram illustrating an example of the pattern selected in a case where the intermediate gear stage that is passed through when the jump-over gear shift is performed is the 7th speed.
Figure 7B:
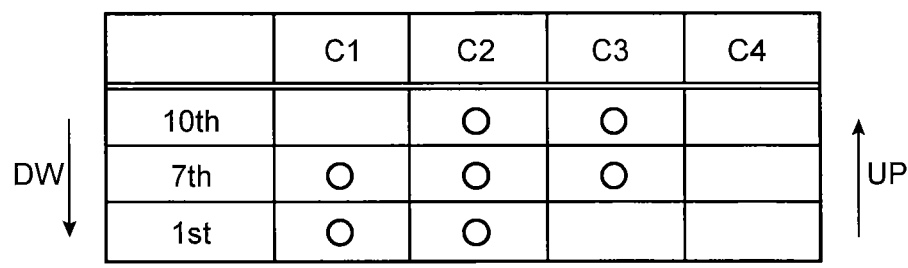
FIG. 7B is a diagram illustrating an example of the pattern selected in a case where the intermediate gear stage that is passed through when the jump-over gear shift is performed is the 7th speed.

FIGS. 6A to 7B are drawings illustrating examples of the clutch combination setting pattern selected in a case where the intermediate gear shift stage that is passed through when the jump-over gear shift is performed is the 7th speed. As illustrated in FIGS. 3 and 4, the 7th speed can be realized by the first clutch C1, the second clutch C2, the third clutch C3, and the fourth clutch C4, and the other gear shift stages are realized by the use of the first brake B1 and the second brake B2 in addition thereto. In FIGS. 6 and 7, however, only the first clutch C1, the second clutch C2, the third clutch C3, and the fourth clutch C4 are illustrated.

In FIG. 6A, the case of a shift from the 10th speed to the 6th speed through the 7th speed (downshift) is illustrated by DW and the case of a shift from the 6th speed to the 10th speed through the 7th speed (upshift) is illustrated by UP. At the 10th speed, the second clutch C2 and the third clutch C3 are engaged. At the 6th speed, the first clutch C1 and the fourth clutch C4 are engaged. In other words, the engaging device realizing the 10th speed and the engaging means realizing the 6th speed are the four clutches of the first clutch C1, the second clutch C2, the third clutch C3, and the fourth clutch C4.

At this time, the intermediate gear shift stage setting unit 82 sets the intermediate gear shift stage such that the numbers of switching of the clutches engaged or released when the shift is performed from the 10th speed to the 6th speed through the 7th speed (hereinafter, referred to as the number of the engaged/released clutches if appropriate) are reduced. As is apparent from FIGS. 3 and 4, the number of the engaged/released clutches during the shift is four (two engaged and two released) in any case of the five setting patterns at the 7th speed. In other words, the setting pattern with the number of switching smaller than that of the setting pattern with the largest number of switching of the engagement or release of the engaging means is absent.

In this case, in the case of the downshift, the 7th speed is realized by the setting pattern including the clutch that realizes the 5th speed which is the down side gear shift stage the most adjacent to the 6th speed being preferentially selected as the setting pattern of the clutch for realizing the 7th speed. Specifically, at the 5th speed, the second clutch C2 and the fourth clutch C4 are used as illustrated in FIG. 3, and thus the setting pattern including the second clutch C2 and the fourth clutch C4 is preferentially selected. In FIG. 6A, the 7th speed according to Pattern 5 is selected as the setting pattern realizing the intermediate gear shift stage as the setting pattern including the fourth clutch C4. The selected setting pattern is not limited to Pattern 5 and may be Pattern 1 or Pattern 3 including the fourth clutch C4. This prevents an increase in the number of switching of the engagement and release of the engaging device, and thus the excessive shift shock can be suppressed. In addition, the rapid acceleration response can be obtained since the number of switching of the engagement and release of the engaging device does not increase even in the case of a subsequent downshift to the 5th speed.

Although the 7th speed according to any one of the setting patterns may be selected as the setting pattern realizing the intermediate gear shift stage in the case of the upshift, it is preferable that the control is simplified by the 7th speed of the same setting pattern as in the case of the downshift being selected. In the case of the upshift from the 6th speed to the 10th speed through the 7th speed, for example, the 7th speed according to Pattern 5 is selected as the setting pattern realizing the intermediate gear shift stage as in the case of the downshift.

In the case of the shift from the 10th speed to the 6th speed, the number of the clutches subjected to the switching is at least four (first clutch C1, second clutch C2, third clutch C3, and fourth clutch C4 to be specific). FIG. 6A, in other words, is the setting pattern realizing the intermediate gear shift stage being selected as the setting pattern realizing the intermediate gear shift stage which is passed through such that the number of engaging devices engaged or released when the shift is performed between the 5th speed that is the down side gear shift stage which is the most adjacent to the 6th speed and the intermediate gear shift stage is two or less (only one, the third clutch C3, to be specific). This selection of the setting pattern realizing the intermediate gear shift stage prevents an increase in the number of switching of the engagement and release of the engaging device even in the case of the downshift to the 5th speed, and thus the rapid acceleration response can be obtained.

In FIG. 6B, the case of a shift from the 10th speed to the 5th speed through the 7th speed (downshift) is illustrated by DW and the case of a shift from the 5th speed to the 10th speed through the 7th speed (upshift) is illustrated by UP. At the 10th speed, the second clutch C2 and the third clutch C3 are engaged. At the 5th speed, the second clutch C2 and the fourth clutch C4 are engaged. In other words, the engaging means realizing the 10th speed and the engaging means realizing the 5th speed are the three clutches of the second clutch C2, the third clutch C3, and the fourth clutch C4.

At this time, the intermediate gear shift stage setting unit 82 selects, as the setting pattern realizing the intermediate gear shift stage, the setting pattern smaller than the setting pattern which has the largest number of the engaged/released clutches at a time of the shift from the 10th speed to the 5th speed through the 7th speed. As is apparent from FIGS. 3 and 4, Pattern 4 has the largest number of the engaged/released clutches at the time of the shift, and the number is six (three engaged and three released). Pattern 5 has the smallest number of the engaged/released clutches at the time of the shift, and the number is two (one engaged and one released). In this case, in any case of the downshift and the upshift, the 7th speed in Pattern 5 is selected as the setting pattern realizing the intermediate gear shift stage. Accordingly, the excessive shift shock can be suppressed.

In FIG. 6C, the case of a shift from the 10th speed to the 4th speed through the 7th speed (downshift) is illustrated by DW and the case of a shift from the 4th speed to the 10th speed through the 7th speed (upshift) is illustrated by UP. At the 10th speed, the second clutch C2 and the third clutch C3 are engaged. At the 4th speed, the fourth clutch C4 is engaged. In other words, the engaging device realizing the 10th speed and the engaging device realizing the 4th speed are the three clutches of the second clutch C2, the third clutch C3, and the fourth clutch C4.

At this time, the intermediate gear shift stage setting unit 82 selects, as the setting pattern realizing the intermediate gear shift stage, the setting pattern smaller than the setting pattern which has the largest number of the engaged/released clutches at a time of the shift from the 10th speed to the 4th speed through the 7th speed. As is apparent from FIGS. 3 and 4, Patterns 1 to 4 have the largest number of the engaged/released clutches at the time of the shift, and the number is five (two engaged and three released). Pattern 5 has the smallest number of the engaged/released clutches at the time of the shift, and the number is three (one engaged and two released). In this case, in any case of the downshift and the upshift, the 7th speed in Pattern 5 is selected as the setting pattern realizing the intermediate gear shift stage. Accordingly, the excessive shift shock can be suppressed.

In FIG. 6D, the case of a shift from the 10th speed to the 3rd speed through the 7th speed (downshift) is illustrated by DW and the case of a shift from the 3rd speed to the 10th speed through the 7th speed (upshift) is illustrated by UP. At the 10th speed, the second clutch C2 and the third clutch C3 are engaged. At the 3rd speed, the second clutch C2 is engaged. In other words, the engaging device realizing the 10th speed and the engaging device realizing the 3rd speed are the two clutches of the second clutch C2 and the third clutch C3.

At this time, the intermediate gear shift stage setting unit 82 selects, as the setting pattern realizing the intermediate gear shift stage, the setting pattern smaller than the setting pattern which has the largest number of the engaged/released clutches at a time of the shift from the 10th speed to the 3rd speed through the 7th speed. As is apparent from FIGS. 3 and 4, Pattern 4 has the largest number of the engaged/released clutches at the time of the shift, and the number is seven (three engaged and four released). Patterns 2 and 5 have the smallest number of the engaged/released clutches at the time of the shift, and the number is three (one engaged and two released).

In this case, in the case of the downshift, the 2nd speed uses the first clutch C1 as the engaged clutch in view of the engaged clutch of the 2nd speed which is the adjacent down side gear shift stage that is the most adjacent to the 3rd speed, and thus the 7th speed in Pattern 2 cannot be set with the second clutch C2 and the third clutch C3, which are the engaging device realizing the 10th speed and the engaging device realizing the 3rd speed, alone in an attempt to realize the 7th speed in Pattern 2. In this regard, in FIG. 6D, the setting pattern that includes the first clutch C1 which realizes the 2nd speed is selected as the setting pattern realizing the 7th speed as the intermediate gear shift stage. In other words, Pattern 2 realizing the 7th speed as the intermediate gear shift stage by the use of the first clutch C1, the second clutch C2, and the third clutch C3 is selected. Then, the excessive shift shock can be suppressed and the number of switching of the engagement and release of the engaging device is reduced even in the case of a subsequent downshift to the 2nd speed. As a result, the rapid acceleration response can be obtained.

The excessive shift shock can also be suppressed even when the 7th speed in Pattern 5 is selected as the setting pattern realizing the intermediate gear shift stage. Although the 7th speed according to Pattern 2 or 5 may be selected as the setting pattern realizing the intermediate gear shift stage in the case of the upshift, it is preferable that the control is simplified by the 7th speed of the same setting pattern as in the case of the downshift being selected.

In the case of the shift from the 10th speed to the 3rd speed, the number of the clutches subjected to the switching is one (third clutch C3). FIG. 6D, in other words, is the setting pattern realizing the intermediate gear shift stage being selected as the intermediate gear shift stage which is passed through such that the number of engaging devices engaged or released when the shift is performed between the 2nd speed that is the down side gear shift stage which is the most adjacent to the 3rd speed and the intermediate gear shift stage is two or less (only two, the second clutch C2 and the third clutch C3, to be specific). This selection of the setting pattern realizing the intermediate gear shift stage reduces the number of switching of the engagement and release of the engaging device even in the case of the downshift to the 2nd speed, and thus the rapid acceleration response can be obtained.

In FIG. 7A, the case of a shift from the 10th speed to the 2nd speed through the 7th speed (downshift) is illustrated by DW and the case of a shift from the 2nd speed to the 10th speed through the 7th speed (upshift) is illustrated by UP. At the 10th speed, the second clutch C2 and the third clutch C3 are engaged. At the 2nd speed, the first clutch C1 is engaged. In other words, the engaging device realizing the 10th speed and the engaging device realizing the 2nd speed are the three clutches of the first clutch C1, the second clutch C2, and the third clutch C3.

At this time, the intermediate gear shift stage setting unit 82 selects, as the setting pattern realizing the intermediate gear shift stage, the setting pattern smaller than the setting pattern which has the largest number of the engaged/released clutches at a time of the shift from the 10th speed to the 2nd speed through the 7th speed. As is apparent from FIGS. 3 and 4, Pattern 1 has the largest number of the engaged/released clutches at the time of the shift, and the number is six (three engaged and three released). Pattern 2 has the smallest number of the engaged/released clutches at the time of the shift, and the number is three (one engaged and two released). In this case, in any case of the downshift and the upshift, the 7th speed in Pattern 2 is selected as the setting pattern realizing the intermediate gear shift stage. Accordingly, the excessive shift shock can be suppressed.

In FIG. 7B, the case of a shift from the 10th speed to the 1st speed through the 7th speed (downshift) is illustrated by DW and the case of a shift from the 1st speed to the 10th speed through the 7th speed (upshift) is illustrated by UP. At the 10th speed, the second clutch C2 and the third clutch C3 are engaged. At the 1st speed, the first clutch C1 and the second clutch C2 are engaged. In other words, the engaging device realizing the 10th speed and the engaging device realizing the 1st speed are the three clutches of the first clutch C1, the second clutch C2, and the third clutch C3.

At this time, the intermediate gear shift stage setting unit 82 selects, as the setting pattern realizing the intermediate gear shift stage, the setting pattern smaller than the setting pattern which has the largest number of the engaged/released clutches at a time of the shift from the 10th speed to the 1st speed through the 7th speed. As is apparent from FIGS. 3 and 4, Pattern 4 has the largest number of the engaged/released clutches at the time of the shift, and the number is six (three engaged and three released). Pattern 2 has the smallest number of the engaged/released clutches at the time of the shift, and the number is two (one engaged and one released). In this case, in any case of the downshift and the upshift, the 7th speed in Pattern 2 is selected as the setting pattern realizing the intermediate gear shift stage. Accordingly, the excessive shift shock can be suppressed.

When it comes to the selected setting pattern realizing the intermediate gear shift stage, the effect of the excessive shift shock suppression is maximized in a case where the number of the engaged/released clutches is minimized as described above. However, the maximization of the effect is not limited to the minimization of number of the engaged/released clutches. In the case of a shift from the 10th speed to the 5th speed through the 7th speed, for example, the number of the engaged/released clutches is four (two engaged and two released) in Patterns 1, 2, and 3 and six (three engaged and three released) in Pattern 4 with the largest number of the engaged/released clutches. Accordingly, even when Patterns 1, 2, and 3 is selected as the 7th speed, the shift shock suppression effect can be obtained more than in the case of Pattern 4.

Figure 8:
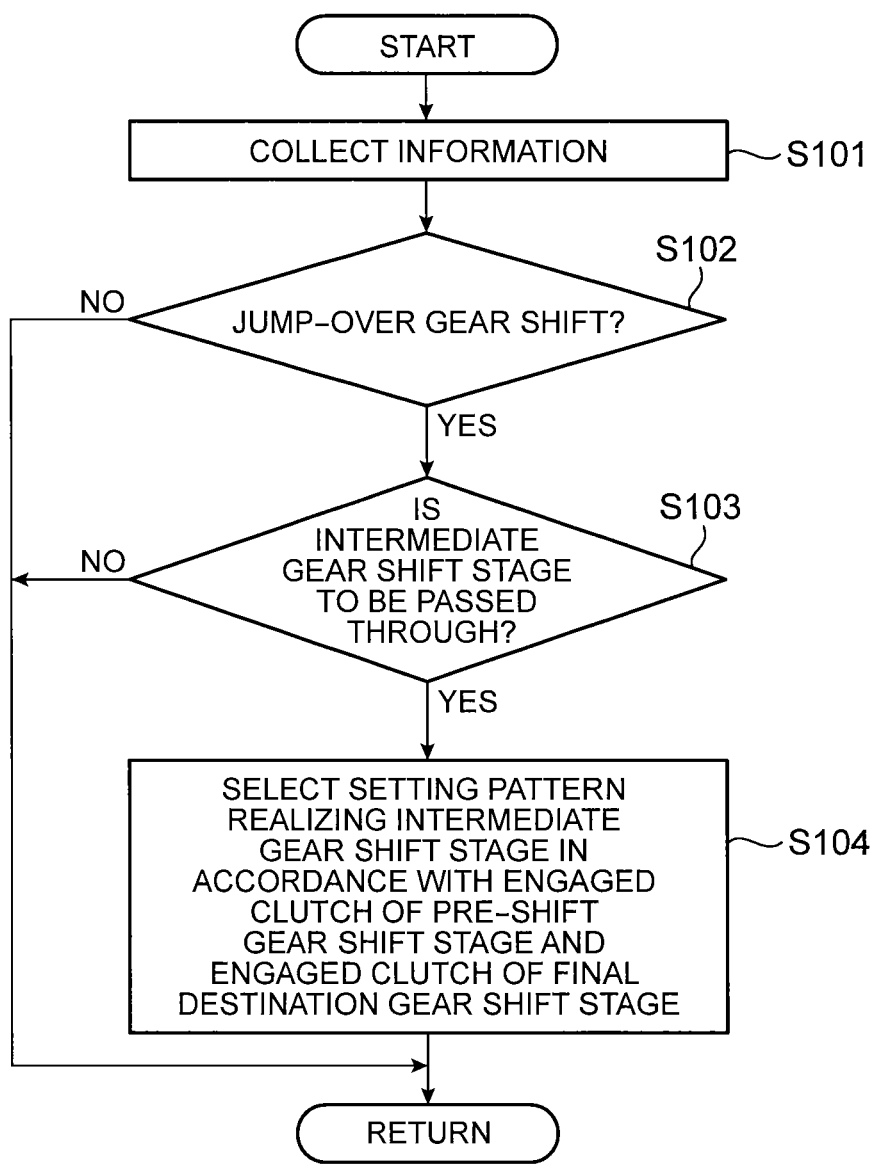
FIG. 8 is a flowchart illustrating an example of a control according to the embodiment.

Hereinafter, an example of a control according to this embodiment will be described in detail with reference to the flowchart that is illustrated in FIG. 8. The control routine that is illustrated in FIG. 8 is repeatedly executed at a predetermined control cycle during the traveling of the vehicle 100.

At first, in Step S101, the ECU 8 collects information. The collected information includes the accelerator opening degree, the vehicle speed, the engine rotation speed, the turbine rotation speed, and a lock-up clutch operation flag. The accelerator opening degree and the vehicle speed are used for a shift determination. The engine rotation speed and the turbine rotation speed are used for a shift progress situation determination. The lock-up clutch operation flag is used as information for a hydraulic pressure control by the hydraulic pressure control unit 7 regarding the clutches and the brakes.

Then, in Step S102, the determination unit 81 of the ECU 8 determines whether or not to perform the jump-over gear shift that is the shift to the second gear shift stage which is separated by at least two stages from the first gear shift stage. The processing is terminated in a case where it is determined that the jump-over gear shift is not to be performed (Step S102, No). The processing proceeds to Step S103 in a case where it is determined that the jump-over gear shift is to be performed (Step S102, Yes).

In Step S103, the determination unit 81 of the ECU 8 determines whether or not to perform the shift through the intermediate gear shift stage. This determination is performed in view of, for example, whether the torque response of the engine that is the power source 1 is delayed from the accelerator opening degree and the current gear shift stage. The processing is terminated in a case where it is determined that the intermediate gear shift stage is not to be passed through (Step S103, No). The processing proceeds to Step S104 in a case where it is determined that the intermediate gear shift stage is to be passed through (Step S103, Yes).

In Step S104, the intermediate gear shift stage setting unit 82 of the ECU 8 selects, as the setting pattern realizing the intermediate gear shift stage, the setting pattern with the number of switching of the engagement or release of the engaging device smaller than that of the setting pattern with the largest number of switching in accordance with the engaged clutch of the first gear shift stage (pre-shift gear shift stage) and the engaged clutch of the second gear shift stage (final destination gear shift stage). Then, the intermediate gear shift stage setting unit 82 controls the clutch, and then the processing is terminated.

Figure 9:
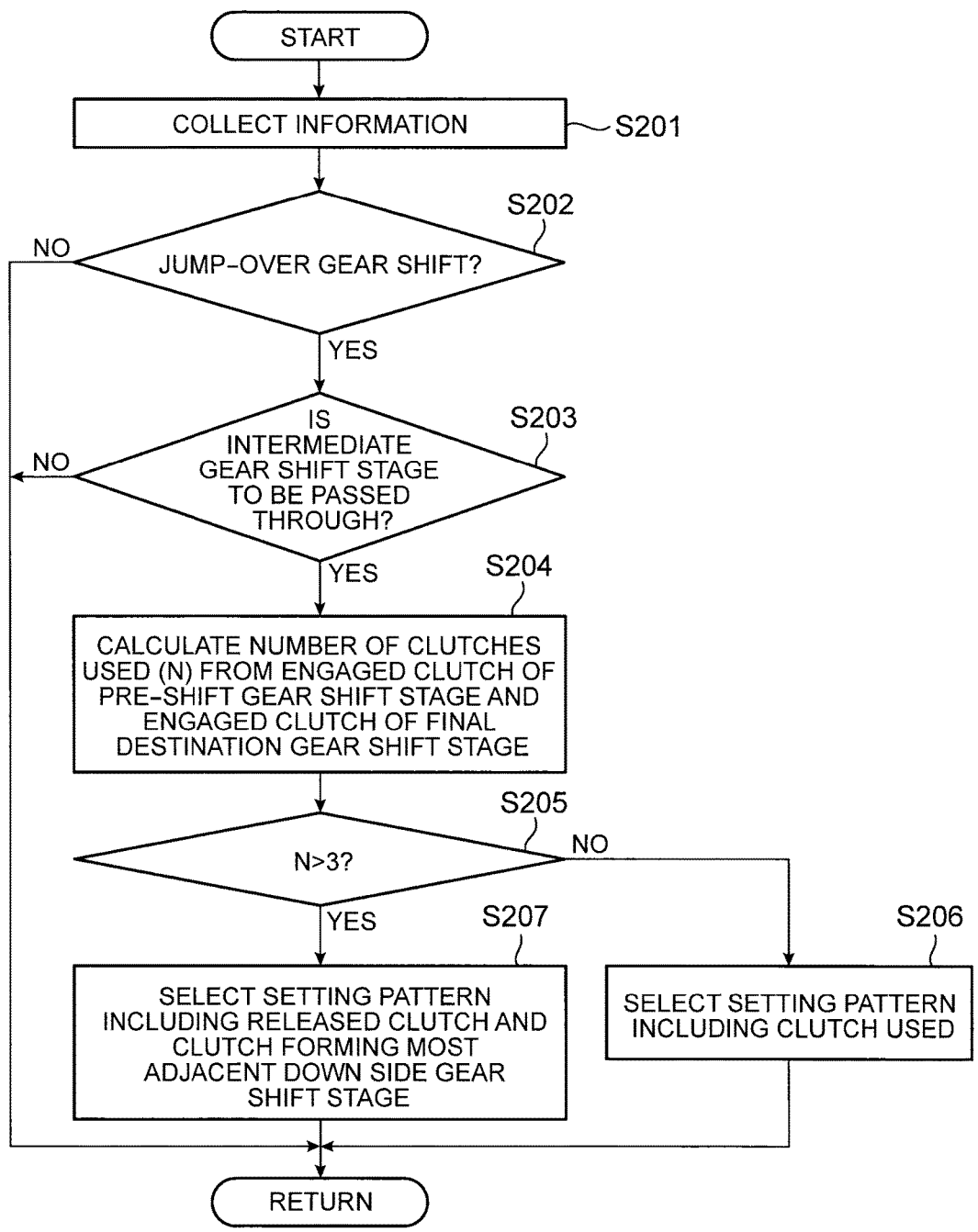
FIG. 9 is a flowchart illustrating another example of the control according to the embodiment.

FIG. 9 is a flowchart illustrating another example of the control according to the embodiment. Steps S201 to S203 are similar to Steps S101 to S103 in FIG. 8, and thus description thereof will be omitted. The processing proceeds to Step S204 in a case where the determination unit 81 of the ECU 8 determines in Step S203 that the intermediate gear shift stage is to be passed through (Step S203, Yes).

In Step S204, the intermediate gear shift stage setting unit 82 of the ECU 8 calculates the number N of the clutches used from the engaged clutch of the first gear shift stage (pre-shift gear shift stage) and the engaged clutch of the second gear shift stage (final destination gear shift stage). The number N of the clutches used refers to the number of all the clutches released, engaged, or maintained to be engaged. For example, the number of the clutches used is four in the case of a shift from the 10th speed to the 6th speed.

Then, in Step S205, the intermediate gear shift stage setting unit 82 of the ECU 8 determines whether or not N is larger than three, that is, whether or not N is equal to or larger than four. The processing proceeds to Step S206 in a case where it is determined that N is not larger than three, that is, in a case where it is determined that N is equal to or smaller than three (Step S205, No). The processing proceeds to Step S207 in a case where it is determined that N is larger than three (Step S205, Yes).

In Step S206, the intermediate gear shift stage setting unit 82 of the ECU 8 selects, as the setting pattern realizing the intermediate gear shift stage, the setting pattern that includes the clutch which is used. Then, the processing is terminated. Referring to FIG. 6B as an example, for example, the number N of the clutches used is three (second clutch C2, third clutch C3, and fourth clutch C4). Herein, as in FIG. 6B, the 7th speed of Pattern 5 is selected as the setting pattern realizing the intermediate gear shift stage as the setting pattern that includes the second clutch C2, the third clutch C3, and the fourth clutch C4 which are the clutches used. The same applies to the cases of FIGS. 6C, 7A, and 7B.

In Step S207, the intermediate gear shift stage setting unit 82 of the ECU 8 selects, as the setting pattern realizing the intermediate gear shift stage, the setting pattern that includes the released clutch and the clutch realizing the most adjacent down side gear shift stage. Then, the processing is terminated. Herein, the released clutch refers to the clutch that is released during the shift from the intermediate gear shift stage to the second gear shift stage. Referring to FIG. 6A as an example, for example, the number N of the clutches used is four. In addition, the released clutches are the second clutch C2 and the third clutch C3, and the clutch realizing the most adjacent down side gear shift stage is the fourth clutch C4. As in FIG. 6A, the 7th speed of Pattern 5 is selected as the setting pattern realizing the intermediate gear shift stage as the setting pattern that includes the second clutch C2, the third clutch C3, and the fourth clutch C4.

Figure 10:
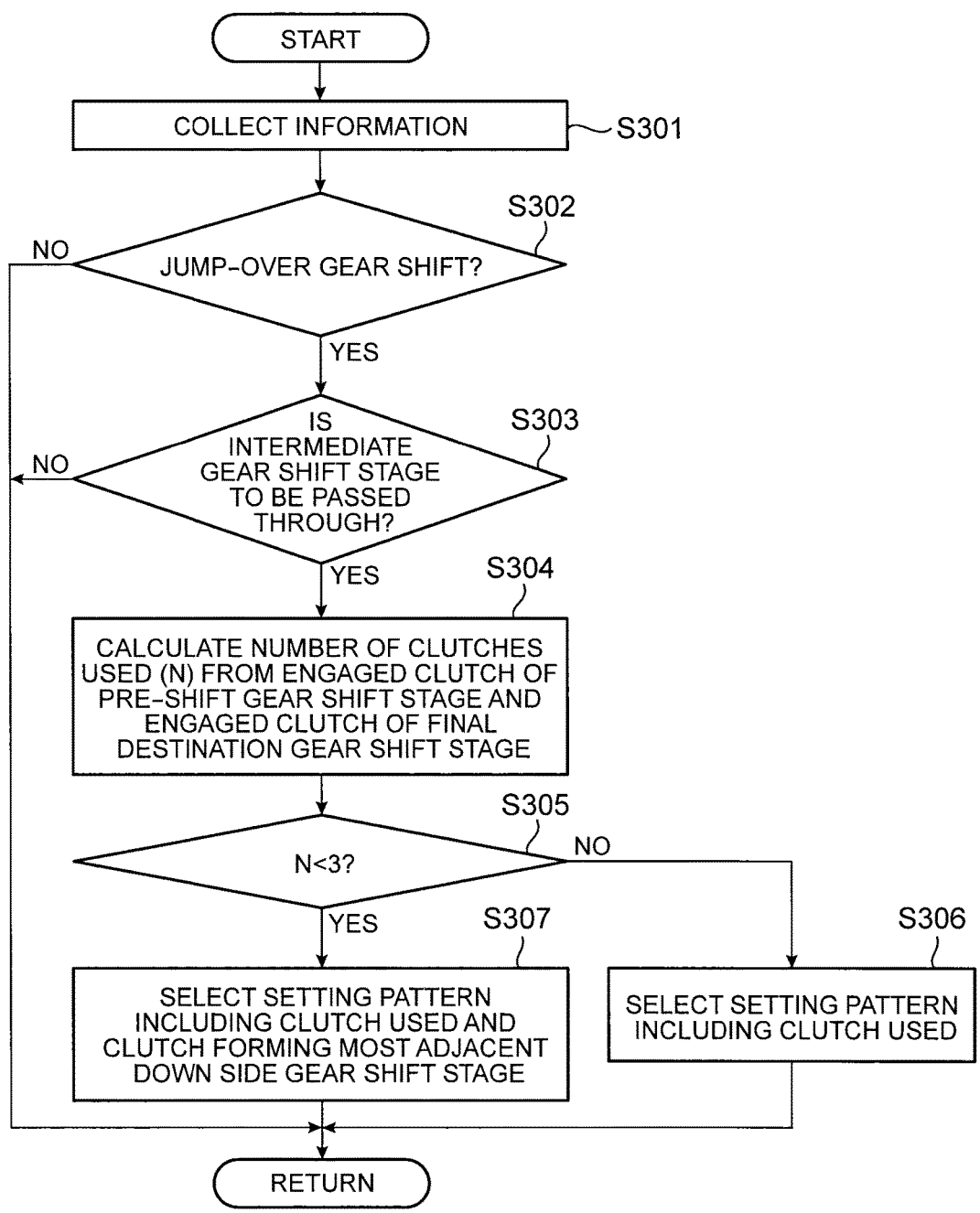
FIG. 10 is a flowchart illustrating yet another example of the control according to the embodiment.

FIG. 10 is a flowchart illustrating yet another example of the control according to the embodiment. Steps S301 to S303 are similar to Steps S101 to S103 in FIG. 8, and thus description thereof will be omitted. The processing proceeds to Step S304 in a case where the determination unit 81 of the ECU 8 determines in Step S303 that the intermediate gear shift stage is to be passed through (Step S303, Yes).

In Step S304, the intermediate gear shift stage setting unit 82 of the ECU 8 calculates the number N of the clutches used from the engaged clutch of the first gear shift stage (pre-shift gear stage) and the engaged clutch of the second gear shift stage (final destination gear stage).

Then, in Step S305, the intermediate gear shift stage setting unit 82 of the ECU 8 determines whether or not N is smaller than three, that is, whether or not N is equal to or smaller than two. The processing proceeds to Step S306 in a case where it is determined that N is not smaller than three, that is, in a case where it is determined that N is equal to or larger than three (Step S305, No). The processing proceeds to Step S307 in a case where it is determined that N is smaller than three (Step S305, Yes).

In Step S306, the intermediate gear shift stage setting unit 82 of the ECU 8 selects, as the setting pattern realizing the intermediate gear shift stage, the setting pattern that includes the clutch which is used as in Step S206 in FIG. 9. Then, the processing is terminated.

In Step S307, the intermediate gear shift stage setting unit 82 of the ECU 8 selects, as the setting pattern realizing the intermediate gear shift stage, the setting pattern that includes the clutch used and the clutch realizing the most adjacent down side gear shift stage. Then, the processing is terminated. Referring to FIG. 6D as an example, for example, the number N of the clutches used is two (second clutch C2 and third clutch C3). The most adjacent down side gear shift stage is the 2nd speed. As in FIG. 6D, the setting pattern that includes the second clutch C2 and the third clutch C3, which are the clutch used, and the first clutch C1, which realizes the most adjacent down side gear shift stage, is selected as the setting pattern realizing the intermediate gear shift stage.

Figure 11:
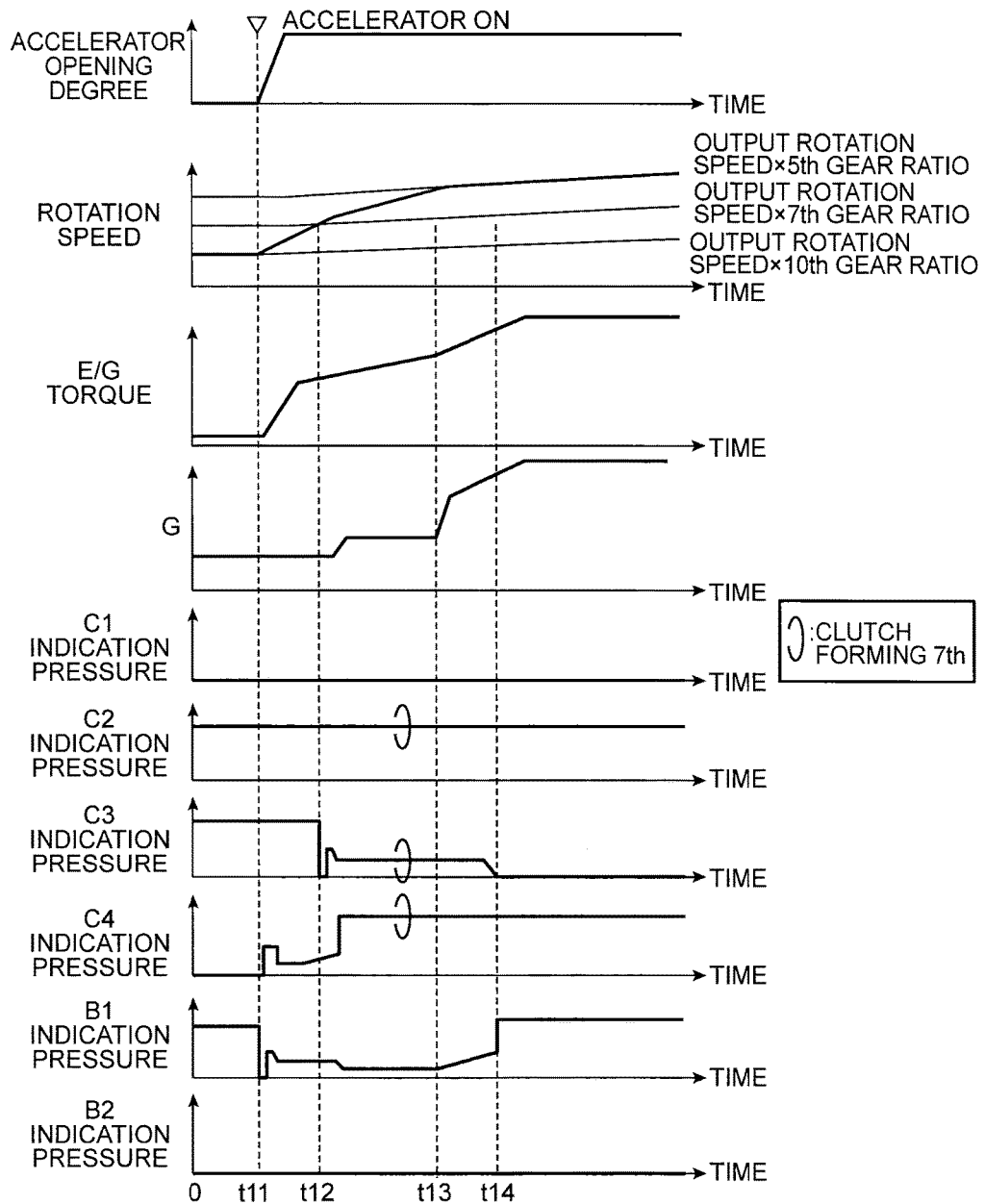
FIG. 11 is a time chart illustrating an example of the control according to the embodiment.

FIG. 11 is a time chart illustrating an example of the control according to the embodiment. FIG. 11 shows the case of a shift from the 10th speed to the 5th speed through the 7th speed as illustrated in FIG. 6B. In FIG. 11, the thick line of the "rotation speed" represents the rotation speed of the input shaft of the automatic transmission 2 and the thin line of the "rotation speed" represents the rotation speed of the output shaft of the automatic transmission 2 multiplied by the gear ratio of each gear shift stage. The "E/G torque" represents the engine torque of the power source 1. "G" represents the acceleration of the vehicle 100. The indication pressure represents an indicated value of the hydraulic pressure of the hydraulic pressure control unit 7 with respect to each clutch and brake. In other words, the "C1 indication pressure" represents the indicated value of the hydraulic pressure with respect to the first clutch C1 and the "B1 indication pressure" represents the indicated value of the hydraulic pressure with respect to the first brake B1.

At first, at time t=0, the vehicle 100 travels at the 10th speed. At this time, the C2 indication pressure, the C3 indication pressure, and the B1 indication pressure are high and the 10th speed remains realized by these being engaged. Then, once the accelerator is depressed and the accelerator opening degree increases at time t=t11, the E/G torque increases and the rotation speed of the input shaft of the automatic transmission 2 also rises. In addition, the B1 indication pressure decreases and the C4 indication pressure increases, and a transition to the 7th speed is initiated. At time t=t12, the rotation speed of the input shaft of the automatic transmission 2 becomes close to the rotation speed of the output shaft of the automatic transmission 2 multiplied by the gear ratio of the 7th speed. Then, after t12, the C4 indication pressure further increases and the 7th speed is realized. As a result, acceleration corresponding to the 7th speed is generated between time t=t12 and t13. The third clutch C3 is released at the 5th speed, and thus the C3 indication pressure is reduced for a smooth transition to the 5th speed.

At time t=t13, the rotation speed of the input shaft of the automatic transmission 2 becomes close to the rotation speed of the output shaft of the automatic transmission 2 multiplied by the gear ratio of the 5th speed. From time t=t13 to t14, the transition to the 5th speed is performed, the B1 indication pressure for realizing the 5th speed rises, and the C3 indication pressure is further reduced. At time t14, the transition to the 5th speed is completed. Then, acceleration corresponding to the 5th speed is obtained.

Since the acceleration corresponding to the 7th speed is generated between time t=t12 and t13 as described above, a sense of sluggish acceleration that the driver feels is reduced, and thus drivability is improved.

Figure 12:
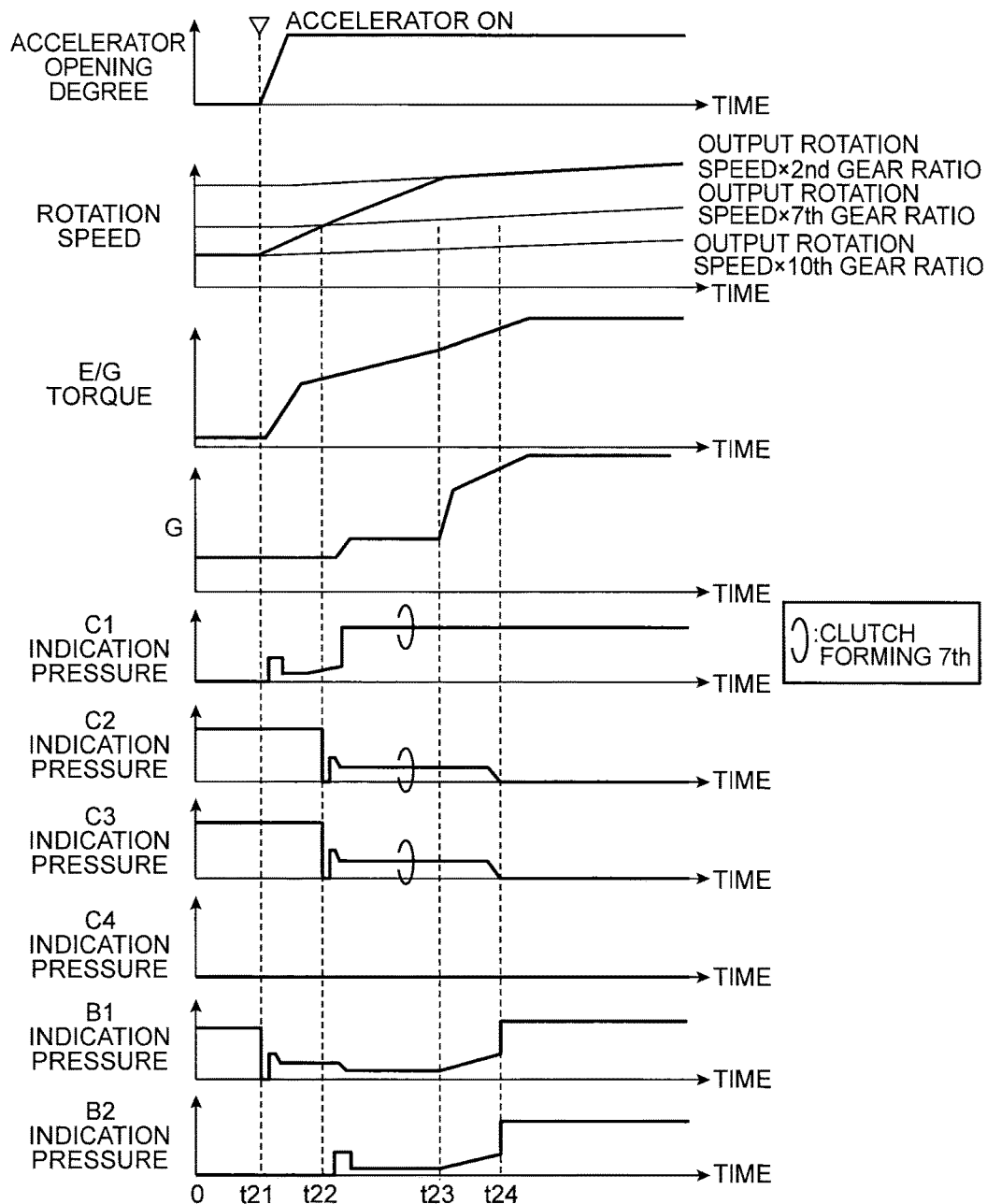
FIG. 12 is a time chart illustrating another example of the control according to the embodiment.

FIG. 12 is a time chart illustrating another example of the control according to the embodiment. FIG. 12 shows the case of a shift from the 10th speed to the 2nd speed through the 7th speed as illustrated in FIG. 7A.

At first, at time t=0, the vehicle 100 travels at the 10th speed. At this time, the C2 indication pressure, the C3 indication pressure, and the B1 indication pressure are high and the 10th speed remains realized by these being engaged. Then, once the accelerator is depressed and the accelerator opening degree increases at time t=t21, the E/G torque increases and the rotation speed of the input shaft of the automatic transmission 2 also rises. In addition, the B1 indication pressure decreases and the C1 indication pressure increases, and a transition to the 7th speed is initiated. At time t=t22, the rotation speed of the input shaft of the automatic transmission 2 becomes close to the rotation speed of the output shaft of the automatic transmission 2 multiplied by the gear ratio of the 7th speed. Then, after t22, the C1 indication pressure further increases and the 7th speed is realized. As a result, acceleration corresponding to the 7th speed is generated between time t=t22 and t23. The second clutch C2 and the third clutch C3 are released at the 2nd speed, and thus the C2 indication pressure and the C3 indication pressure are reduced for a smooth transition to the 2nd speed. In addition, the B2 indication pressure rises as a preparation for the transition to the 2nd speed.

At time t=t23, the rotation speed of the input shaft of the automatic transmission 2 becomes close to the rotation speed of the output shaft of the automatic transmission 2 multiplied by the gear ratio of the 2nd speed. From time t=t23 to t24, the transition to the 2nd speed is performed, the B1 indication pressure and the B2 indication pressure for realizing the 2nd speed rise, and the C2 indication pressure and the C3 indication pressure are further reduced. At time t24, the transition to the 2nd speed is completed. Then, acceleration corresponding to the 2nd speed is obtained.

Since the acceleration corresponding to the 7th speed is generated between time t=t22 and t23 as described above, the sense of sluggish acceleration that the driver feels is reduced, and thus the drivability is improved.

The invention is not limited to the embodiment described above. Configurations resulting from appropriate combination of the above-described elements are also included in the invention. In addition, further effects and modification examples can be easily derived by those skilled in the art. Accordingly, broader aspects of the invention are not limited to the above-described embodiment and can be modified in various forms.

What is claimed is:

1. A control device for an automatic transmission, the automatic transmission being mounted in a vehicle, the automatic transmission including a plurality of engaging devices, the plurality of engaging devices having engaging elements engaged with each other, and the automatic transmission being configured to realize a plurality of gear shift stages by combination of the plurality of engaging devices engaged or released among the plurality of engaging devices, the control device comprising:
an electronic control unit configured to:
determine whether or not to perform a shift through an intermediate gear shift stage present between a first gear shift stage and a second gear shift stage when the shift is performed to the second gear shift stage separated by at least two stages from the first gear shift stage, the combination of the engaging devices realizing the intermediate gear shift stage having a plurality of setting patterns; and
select, as the setting pattern realizing the intermediate gear shift stage, the setting pattern with a smaller number of switching of the engagement or release of the engaging device than the number of switching of the setting pattern with the largest number of switching among the plurality of setting patterns when the shift is performed from the first gear shift stage to the second gear shift stage through the intermediate gear shift stage in a case where the electronic control unit determines that the shift is to be performed through the intermediate gear shift stage.

2. The control device according to claim 1,
wherein the electronic control unit is configured to select, as the setting pattern realizing the intermediate gear shift stage, the setting pattern including the engaging device realizing a down side gear shift stage the most adjacent to the second gear shift stage in a case where it is determined that the intermediate gear shift stage cannot be realized with the engaging device realizing the first gear shift stage and the engaging device realizing the second gear shift stage alone with the second gear shift stage being a gear shift stage on a downshift side of the first gear shift stage.

3. The control device according to claim 1,
wherein the electronic control unit is configured to select, as the setting pattern realizing the intermediate gear shift stage, the setting pattern including the engaging device realizing a down side gear shift stage the most adjacent to the second gear shift stage in a case where the setting pattern with the smaller number of switching is not present with the second gear shift stage being a gear shift stage on a downshift side of the first gear shift stage.

4. The control device according to claim 1,
wherein the electronic control unit is configured to select, as the setting pattern realizing the intermediate gear shift stage, the setting pattern in which the number of the engaging devices engaged or released when the shift is performed between a downshift side gear shift stage the most adjacent to the second gear shift stage and the intermediate gear shift stage becomes two or less when the number of the engaging devices engaged or released is four or more in a case where the shift is performed from the first gear shift stage to the second gear shift stage with the second gear shift stage being a gear shift stage on a downshift side of the first gear shift stage.

\* \* \* \* \*